(12) United States Patent
Fu et al.

(10) Patent No.: US 10,912,309 B1
(45) Date of Patent: Feb. 9, 2021

(54) METHOD FOR PROCESSING BACON PIECES

(71) Applicant: Tyson Foods, Inc., Springdale, AR (US)

(72) Inventors: Dejing Fu, Lisle, IL (US); Anthony Lynn Lockard, Fayetteville, AR (US); Kent Michael Bearson, Naperville, IL (US); William Vander Baan, Fayetteville, AR (US)

(73) Assignee: TYSON FOODS, INC., Springdale, AR (US)

( * ) Notice: Subject to any disclaimer, the term of this patent is extended or adjusted under 35 U.S.C. 154(b) by 159 days.

(21) Appl. No.: 15/898,821

(22) Filed: Feb. 19, 2018

Related U.S. Application Data

(60) Provisional application No. 62/460,180, filed on Feb. 17, 2017.

(51) Int. Cl.
*A23B 4/01* (2006.01)
*A23B 4/027* (2006.01)
(Continued)

(52) U.S. Cl.
CPC ............ *A23B 4/01* (2013.01); *A22C 11/0209* (2013.01); *A23B 4/027* (2013.01); *A23B 4/044* (2013.01);
(Continued)

(58) Field of Classification Search
CPC ......... A23B 4/00; A23B 4/005; A23B 4/0053; A23B 4/01; A23B 4/002; A23B 4/027; A23B 4/044; A23B 4/048; A23B 4/056; A23B 4/26; A23B 4/32; A22C 5/00; A22C 7/00; A22C 7/0007; A22C 7/0023; A22C 11/00; A22C 11/02; A22C 11/0209;
(Continued)

(56) References Cited

U.S. PATENT DOCUMENTS 2,444,050 A    6/1948  Knowlton et al.
2,771,366 A *  11/1956  Shadid .................... A23L 13/67
                                                    426/388

(Continued)

FOREIGN PATENT DOCUMENTS

CA    2706407  A1   11/2010
WO    2007041590 A1    4/2007
WO    2013173877 A1   11/2013

OTHER PUBLICATIONS

Fresh Food NPL, published Jan. 13, 2005, https://web.archive.org/web/20050113075038/https://www.thefreedictionary.com/fresh+food (Year: 2005).*

*Primary Examiner* — Drew E Becker
*Assistant Examiner* — Bryan Kim
(74) *Attorney, Agent, or Firm* — Greensfelder, Hemker & Gale; Mark E. Stallion

(57) ABSTRACT

An method for processing pork belly trim to produce bacon pieces where pork belly trim is size reduced and cooked. One implementation of the technology includes initial cooking and separating the product and distributing the product evenly on a conveyor. The step of initial cooking and separation is utilized because depending on the amount of size reduction and the type of size reduction, the product will tend to lump together. Therefore, in one implementation of the technology, an initial step of initial cooking and separation is utilized.

18 Claims, 3 Drawing Sheets

(51) Int. Cl.
*A23B 4/044* (2006.01)
*A23P 10/25* (2016.01)
*A23L 5/10* (2016.01)
*A23L 13/10* (2016.01)
*A23L 13/60* (2016.01)
*A22C 11/02* (2006.01)
*A23P 30/20* (2016.01)
*A23L 3/358* (2006.01)
*A23L 3/18* (2006.01)

(52) U.S. Cl.
CPC .............. *A23L 3/18* (2013.01); *A23L 3/358* (2013.01); *A23L 5/15* (2016.08); *A23L 13/10* (2016.08); *A23L 13/60* (2016.08); *A23P 10/25* (2016.08); *A23P 30/20* (2016.08); *A23V 2300/38* (2013.01)

(58) Field of Classification Search
CPC ........... A22C 11/0218; A22C 11/0254; A22C 11/028; A22C 17/0006; A22C 17/002; A22C 17/0026; A23P 30/20; A23P 10/00; A23P 10/20; A23P 10/25; A23P 30/00; A23P 30/25; B29C 48/146; B29C 48/147; B29C 48/1472; B29C 48/30; B29C 48/3001; B29C 48/3003; B29C 48/302; B29C 48/305; B29C 48/31; B29C 48/315; A23L 3/16; A23L 3/165; A23L 3/18; A23L 3/185; A23L 5/11; A23L 5/12; A23L 5/15; A23L 5/18; A23L 5/19; A23L 13/00; A23L 13/10; A23L 13/20; A23L 13/52; A23L 13/60; A23L 13/67; A47J 27/00; A47J 27/002; A47J 27/004; A47J 36/00
See application file for complete search history.

(56) References Cited

U.S. PATENT DOCUMENTS

| | | | | |
|---|---|---|---|---|
| 2,905,967 A * | 9/1959 | Hensgen | ............... | A22C 7/00 425/377 |
| 3,693,533 A * | 9/1972 | Liepa | ............... | A23J 3/227 99/373 |
| 3,748,146 A | 7/1973 | Anderson et al. | | |
| 3,834,849 A * | 9/1974 | Supran | ............... | A22C 7/00 425/206 |
| 3,901,981 A | 8/1975 | Draught | | |
| 3,903,315 A * | 9/1975 | Giles | ............... | A22C 7/00 426/388 |
| 4,125,635 A * | 11/1978 | de Ruyter | ............... | A23J 3/26 426/506 |
| 4,305,965 A * | 12/1981 | Cheney | ............... | A23B 4/0235 426/104 |
| 4,614,489 A * | 9/1986 | Juravic | ............... | A22C 7/00 264/169 |
| 4,868,002 A * | 9/1989 | Scaglione | ............... | A23L 13/67 426/641 |
| 4,883,421 A * | 11/1989 | Morgan | ............... | A23L 13/67 425/135 |
| 4,995,803 A * | 2/1991 | Champalaune | ........... | A22C 7/00 425/190 |
| 5,004,622 A * | 4/1991 | Choquette | ............... | A22C 7/00 426/513 |
| 5,176,925 A * | 1/1993 | Weber | ............... | B29C 48/30 425/191 |
| 5,798,133 A | 8/1998 | Kunert | | |
| 5,827,561 A * | 10/1998 | Duve | ............... | A23P 30/20 426/513 |
| 5,830,525 A * | 11/1998 | Cozzini | ............... | A23B 4/02 426/641 |
| 58,337,305 | 11/1998 | Kunert | | |
| 5,997,925 A * | 12/1999 | Wilson | ............... | A23B 4/023 426/332 |
| 6,224,927 B1 * | 5/2001 | Paulos | ............... | A23L 13/424 426/266 |
| 6,319,539 B1 * | 11/2001 | Shemer | ............... | A23J 3/14 426/448 |
| 6,391,355 B1 | 5/2002 | Kunert et al. | | |
| 6,547,658 B2 | 4/2003 | Boody et al. | | |
| 6,834,576 B2 | 12/2004 | Leitinger | | |
| 8,293,297 B2 * | 10/2012 | Orcutt | ............... | A23J 3/26 425/376.1 |
| 8,337,934 B2 | 12/2012 | Kunert et al. | | |
| 8,945,643 B2 | 2/2015 | Carlson et al. | | |
| 8,968,808 B1 | 3/2015 | Kunert et al. | | |
| 2004/0265456 A1 * | 12/2004 | Halverson | ............... | A22C 15/001 426/516 |
| 2005/0085176 A1 | 4/2005 | Houtz | | |
| 2005/0214421 A1 * | 9/2005 | Howard | ............... | A21C 11/163 426/516 |
| 2006/0165862 A1 * | 7/2006 | Kunert | ............... | A23L 13/72 426/523 |
| 2007/0071878 A1 * | 3/2007 | Huebner | ............... | A23L 17/40 426/646 |
| 2009/0252832 A1 * | 10/2009 | Falk | ............... | A23B 4/023 426/59 |
| 2010/0130114 A1 | 5/2010 | Bolte et al. | | |
| 2010/0304652 A1 | 12/2010 | Bolte et al. | | |
| 2015/0296834 A1 * | 10/2015 | Geistlinger | ............... | A23J 3/227 426/657 |
| 2016/0050963 A1 * | 2/2016 | Du Preez | ............... | A23L 29/256 426/92 |
| 2016/0106112 A1 | 4/2016 | Dunivan | | |
| 2016/0205986 A1 * | 7/2016 | Walther | ............... | A23J 3/26 |
| 2017/0354165 A1 * | 12/2017 | Palmer | ............... | A23J 3/225 |

\* cited by examiner

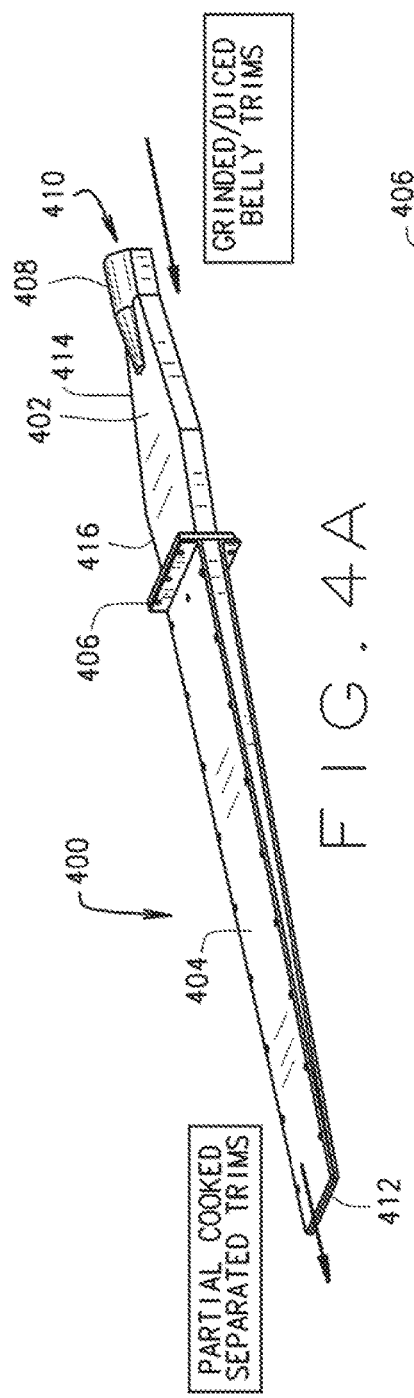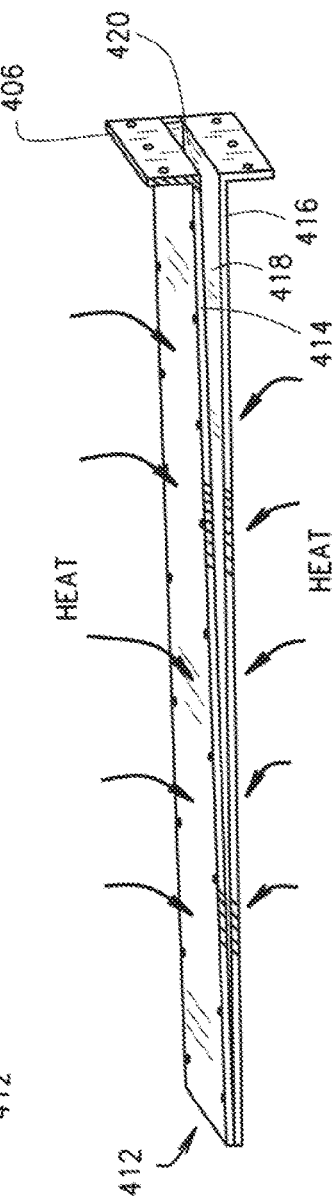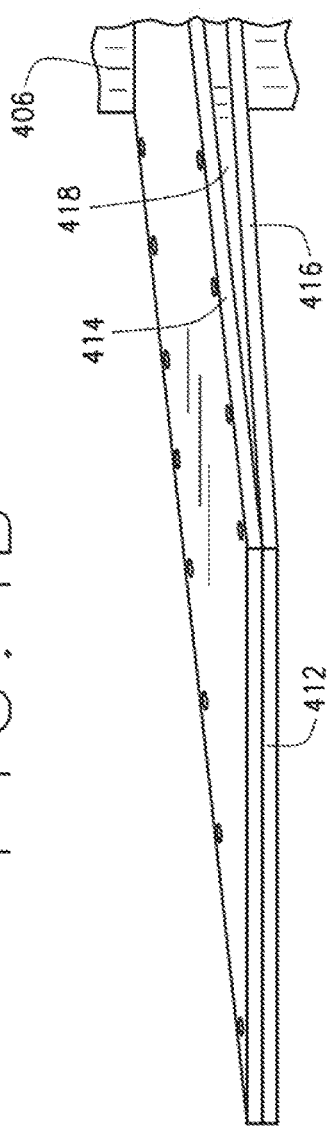

METHOD FOR PROCESSING BACON PIECES

CROSS REFERENCE

This Application Claims The Benefit Of and Priority To—U.S. Provisional Patent Application Ser. No. 62/460,180 Entitled METHOD FOR PROCESSING BACON PIECES, Filed On Feb. 17, 2017, Which Is Incorporated Herein By Reference In Its Entirety.

BACKGROUND

Field

This technology as disclosed herein relates generally to processing of pork bellies and, more particularly, to processing bacon pieces or bacon bits from pork belly trim.

Background

Pork belly is the boneless cut of fatty meat taken from the belly of a pig or hog and are commonly used for bacon strips. Pork belly trim and belly pieces come from trimming whole pork bellies. Pork belly pieces are commonly used to make sausage, bacon bits, and bacon topping. The term "bellies" is generally used to refer to whole bellies, including the belly trim, and belly pieces. The term "bacon pieces" as referred to herein includes bacon bits, which are commonly used for bacon toppings and other products. Uncooked bacon products, cured bellies have a weight not exceeding the weight of uncured bellies, which is commonly referred to as "green weight". For fully cooked bacon products, cured bellies have a yield of usually not more than 40% of the weight of uncured bellies, in other words 60% shrinkage from the green weight of uncured bellies.

Traditionally raw pork bellies are trimmed to remove belly trim leaving a generally rectangular shaped portion, which can be generally be referred to as the bacon slab portion of the pork belly. The slab portion is injected with a flavoring and curing solution, heat treated to allow for curing reactions and proper shrinkage and smoked by burning a hardwood saw dust or atomizing a liquid smoke solution. Cured and smoked belly slab portions are held at approximately 21 degrees F. prior to pressing and slicing. Smoked and cured ends and pieces are removed from the ends of the belly slab portion when slicing and placed in combo bins and held at refrigerated temperatures for further processing. Ends of the generally rectangular slabs, commonly referred to as belly ends and pieces are typically used to make fully cooked bacon pieces. Cured and smoked ends and pieces are placed onto a microwave conveyor and spread to allow for consistent cooking. Microwave energy is used to fully cook or partially cook the bacon ends and pieces to yield <40% from the ingoing uncured weight ("green weight). Fully cooked ends and pieces are typically chilled, diced and packaged for distribution in foodservice or retail channels.

Commonly, cure ingredients are injected into bellies with injection needles to create cured bellies. The term "in solution" is used herein to refer to a substantially homogeneous mixture created by a process by which a solid, liquid, or gaseous substance is substantially homogeneously mixed with a liquid.

The raw pork belly is injected with a flavoring and curing solution. Most cured bellies are cured using a cure ingredients solution, which comprises dry cure ingredients in a water solution. For example, the cure ingredients solution can contain 60 to 70% water by weight of the cure ingredients solution. The bellies are injected with the cure ingredients solution, which adds to the weight of the bellies. To reduce the weight of the injected bellies, they are often cooked in a smokehouse, which cooks off the water. Fully cooked bacon products usually have a yield of 40% or less to be considered fully cooked. The cured bellies are typically further cooked using a microwave oven, a conveyor belt having a heat conductive surface, a conveyor belt passing through one or more cooking chambers, or other suitable cooking devices well known in the art to get fully cooked bacon products to 40% yield or less. The cured and smoked pork bellies are chilled prior to pressing and slicing.

The fully cured, cooked and chilled bacon slices and/or the fully cured, cooked and chilled ends and pieces are diced to make size reduced bacon pieces and bacon bits.

There are several shortcomings of the traditional process including large energy consumption.

The technology as described herein in its various implementations provides a better process to address the shortcomings of the process

SUMMARY

The technology as disclosed herein includes a method for processing raw belly trim into a coarse ground and blending the size reduced pork belly trim with flavoring and curing ingredients that are added to a blender. The materials are blended to distribute the cure and flavoring ingredients throughout the raw belly trim. This mixture is placed on a conveyor and conveyed through a cooking chamber. One implementation of the conveyor is a microwave conveyor and the cooking chamber is a microwave cooking chamber. One implementation of the technology includes initial cooking and separating the product and distributing the product evenly on a conveyor.

The step of initial cooking and separation is utilized because depending on the amount of size reduction and the type of size reduction, the product will tend to lump together. Therefore, in one implementation of the technology, an initial step of initial cooking and separation is utilized, which in one implementation is accomplished using a cooking horn having a tapered interior chamber. In one implementation of the technology, microwave energy is used as a thermal processing method for curing and fully cooking the bacon pieces to yield <40%/(1+X %) from the ingoing weight in one processing step as opposed to traditional processing methods. For example, X % by weight of curing and flavoring ingredients is added to the "Green Weight" (initial uncooked weight) of the raw belly trim such that the total mixed weight is the (Green Weight)*(1+X %). After the thermal process of fully cooking, the yield should be less than 40%/(1+X %). The microwave conveyor and microwave cooking chamber can be replaced with other conveyor and cooking implementations without departing from the scope of the invention.

One implementation of the technology as disclosed includes a method of making bacon pieces including trimming a pork belly trim from a pork belly cut leaving a bacon slab portion of the pork belly cut and size reducing the pork belly trim using one or more of a grinder, dicer and slicer thereby forming a size reduced pork belly trim. The size reduction can be performed by a grinder, dicer or slicer without departing from the scope of the claimed invention. The choice between a grinder, dicer or slicer can be made based on the desired texture and appearance of the size reduced pork belly trim. One implementation of the method can further include applying curing and flavoring ingredients to size reduce pork belly trim and evenly distributing the size reduced pork belly trim across a conveyor and conveying the size reduced pork belly trim through a cooking chamber. One implementation of the method includes fully cooking the size reduced pork belly trim.

One implementation of the method includes blending the sized reduced pork belly trim and the curing and flavoring ingredients in a blender and initially cooking of the size reduced pork belly trim resulting in a partially cooked sized reduced pork belly trim, and separating the partially cooked size reduced pork belly trim. One implementation includes applying a liquid smoke drencher, and where the sized reduced pork belly trim is size reduced with one or more of a grinder, dicer, and slicer configured to size reduce to approximately 0.1 inch to 0.75 inch. One implementation of the method includes cooking with a microwave resulting in a fully cooked size reduced pork belly trim having a yield of approximately 30 percent to 38 percent of the original weight. In one implementation fully cooking is cooking resulting in a fully cooked size reduced pork belly trim having water activity less than 0.85. One implementation of the method includes smoking and curing with ingredients, which includes one or more of phosphates, salts and nitrites.

One implementation of technology as disclosed and claimed is a method of making bacon pieces including flowing a size reduced fresh pork belly trim portions through an entry portal of a sheeting horn and extruding the sized reduced fresh pork belly trim portions through a pre-compression portion of the sheeting horn and through the cooking portion portal of the sheeting horn. One implementation of the method further includes extruding the size reduced fresh pork belly trim portions through an interior channel of the cooking portion of the sheeting horn and restricting flow of the size reduced fresh pork belly trim portion by a narrowing of the interior channel. One implementation of the cooking portion of the sheeting horn performs the denaturing and cooking the size reduced fresh pork belly trim portion by heating with one or more of the upper and lower walls of the interior channel. The method further includes extruding an initially cooked and denatured size reduced pork belly trim portion through an exit portal of the sheeting horn, thereby separating and evenly distributing the initially cooked and denatured size reduced pork belly trim portion as it exits the exit portal. For one implementation of the technology as disclosed and claimed, denaturing and cooking is performed by heating one or more of the upper and lower walls is perform by one or more thermally jacketed upper and lower walls and induction heated upper and lower walls.

The features, functions, and advantages that have been discussed can be achieved independently in various implementations or may be combined in yet other implementations further details of which can be seen with reference to the following description and drawings.

These and other advantageous features of the present technology as disclosed will be in part apparent and in part pointed out herein below.

BRIEF DESCRIPTION OF THE DRAWINGS

For a better understanding of the present technology as disclosed, reference may be made to the accompanying drawings in which:

FIGS. 4A, 4B and 4C are illustrations of a cooking horn;

Figure 1:
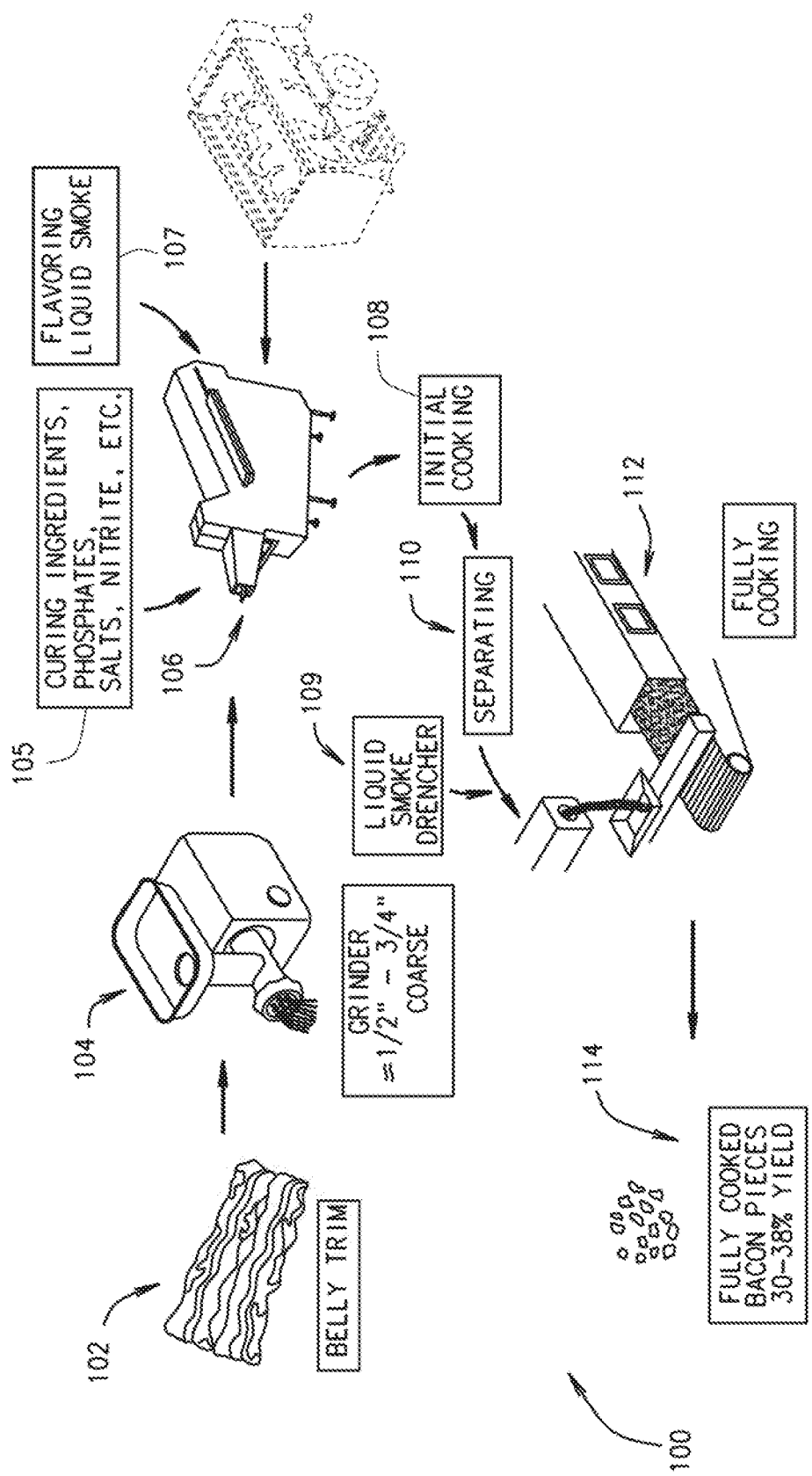
FIG. 1 is a flow diagram illustrating a method for processing bacon bits.

While the technology as disclosed is susceptible to various modifications and alternative forms, specific implementations thereof are shown by way of example in the drawings and will herein be described in detail. It should be understood, however, that the drawings and detailed description presented herein are not intended to limit the disclosure to the particular implementations as disclosed, but on the contrary, the intention is to cover all modifications, equivalents, and alternatives falling within the scope of the present technology as disclosed and as defined by the appended claims.

DESCRIPTION

According to the implementation(s) of the present technology as disclosed, various views are illustrated in FIG. 1-4 and like reference numerals are being used consistently throughout to refer to like and corresponding parts of the technology for all of the various views and figures of the drawing. Also, please note that the first digit(s) of the reference number for a given item or part of the technology should correspond to the Fig. number in which the item or part is first identified. Reference in the specification to "one embodiment" or "an embodiment"; "one implementation" or "an implementation" means that a particular feature, structure, or characteristic described in connection with the embodiment or implementation is included in at least one embodiment or implementation of the invention. The appearances of the phrase "in one embodiment" or "in one implementation" in various places in the specification are not necessarily all referring to the same embodiment or the same implementation, nor are separate or alternative embodiments or implementations mutually exclusive of other embodiments or implementations.

One implementation of the present technology as disclosed and claimed herein comprises a method that teaches a process for processing pork belly trim for bacon pieces. Traditionally raw pork bellies are trimmed to remove what is referred to as "belly trim", whereby after the pork belly is trimmed, a remaining portion minus the trim is left leaving a generally rectangular portion, which is generally referred to as the bacon slab portion of the pork belly. Traditionally the bacon slab portions of the pork bellies are injected with curing and flavoring ingredients and the bacon slab portions of the pork bellies are hung on a tree and/or a rack and placed in a smoke house for initial cooking and smoking. Traditional processing entails slicing the bacon slab portions of the pork bellies (the trimmed pork bellies resulting a general rectangular center portion after the edges are trimmed away) and as a byproduct, the process utilizes the bacon ends and pieces from the bacon slab portion of the trimmed bellies to make fully cooked bacon toppings/pieces. The ends and pieces of the bacon slab portion are typically placed in a combo container and chilled. Subsequently, as part of the traditional process, the ends and pieces are typically cooked and chilled again and then sized reduced prior packaging for distribution.

Whereas, the technology as disclosed and claimed herein utilizes the fresh belly trim that is initially trimmed away from the raw whole pork belly cut to create the bacon slab portion and the process as disclosed and claimed, by utilizing the fresh belly trim rather than relying on the end pieces that are a byproduct of the bacon slab processing, removes several of the traditional processing steps by processing the fresh belly trim, converting the fresh belly trim to bacon pieces and fully cooking in one thermal processing step. As described previously, in a traditional bacon process, the bacon slab portions of the pork bellies are injected with a flavor/curing solution, smoked/cooked, chilled, pressed, sliced. The ends and pieces traditionally used for fully cooked bacon toppings/pieces are removed from the bacon slab slicing line, bulk pack and chilled before processing. The pre-chilled bacon ends and pieces are transferred to a slicer and sliced and then transferred onto a microwave conveyor. The sliced bacon ends and pieces are fully cooked in accordance with USDA regulations to a cook yield of less than 40% of the original weight. The problem is traditional processing limits the availability of the raw material (bacon ends and pieces from the bacon slab portion) to the original bacon slab slicing operation. This limits the production capability for fully cooked bacon toppings/pieces. There is a very limited supply in the industry for raw bacon ends and pieces.

The process as disclosed and claimed herein will use raw pork belly trim. The pork belly trim is sized reduced to a uniform size and placed into a blender. The size reduction is accomplished by one or more methods including but not limited to grinding, dicing and slicing without departing from the scope of the technology as disclosed and claimed herein. Grinding, dicing and/or slicing can be selectively chosen and utilized in the process as disclosed and claimed to achieve the desired size, consistency of the product, surface area of the product, texture and/or appearance of the product. Flavor/curing ingredients are added to the blender and the mixture is blended for a few minutes to incorporate the ingredients into the product. The amount of flavoring/curing ingredients utilized can vary depending on the sizing (the amount of size reduction) of the product resulting from the size reduction and the type of size reduction utilized whether grinding, dicing or slicing. The duration of the blending cycle may also vary depending on the consistency of the product, the surface area of the produce and it's exterior texture. However, primarily, the amount of flavoring and curing ingredients utilized can vary depending on the type of ingredient and the customer's need and preference. The pork belly trim is then transferred to the microwave or oven conveyor and deposited on the conveyor via a thermal jacketed sheeting horn.

The thermal jacketed sheeting horn is used to evenly deposit the pork belly trim and starts the initial cooking to denature surface protein to keep the mixture from sticking together when it is fully cooked. The thermal jacketed sheeting horn in addition to denaturing and beginning the cooking process, also assists in separating the product into small pieces as opposed to the product clinging (lumping) together or forming one solid sheet or mass. The exit portal is of the cooking horn is designed to evenly distribute the product across a conveyor. Thermal energy via microwave or traditional oven is used to convert the pork belly trim mixture to bacon by converting the curing ingredients prior to fully cooking the product. The product is fully cooked to meet USDA regulations to a cook yield of 40% of the original weight. The product is fully cooked by thermally processing utilizing one or more of microwave cooking, linear ovens—convection or otherwise, spiral ovens, and oil cooking. A conveyor conveys the product through the thermal processor. The intensity of the thermal energy applied to the product and the duration of the thermal application can vary depending on the sizing of the size reduction and the consistency of the product. The cooking energy utilized is based on the desired cooking yield weight. The lower the yield, the more crispy the product and the greater the moisture reduction. The nutritional levels are also lower as the yield weight is lower. The fully cooked product is chilled and the product can be further size reduced as needed and as desired to meet product specifications. The bacon pieces product packaged for foodservice or retail distribution. The USDA requires bacon to be made from the belly of porcine species in order to label bacon in commerce. The process as disclosed and claimed herein will allow the manufacturer to make fully cooked bacon toppings/pieces in a manner that will reduce processing steps that will reduce overall energy consumption and reduce processing costs associated with traditional processing methods. The finally cooked product utilizing this process is fully cured and cooked achieving a yield of less than 40%/(1+X %) and water activity should be less than 0.85 for shelf stability.

The details of the technology as disclosed and various implementations can be better understood by referring to the figures of the drawing. Referring to FIG. 1, a flow diagram 100 is provided illustrating a method for producing bacon pieces as disclosed and claimed herein. The method of making bacon pieces as illustrated in FIG. 1 includes trimming a pork belly trim from a pork belly cut leaving a bacon slab portion of the pork belly cut. The pork belly trim 102, that is a byproduct of the whole raw pork belly trimming process, is further processed by size reducing 104 the pork belly trim using one or more of a grinder, as illustrated, a dicer and a slicer thereby forming a size reduced pork belly trim. The pork belly trim is sized reduced to a uniform size and placed into a blender. The size reduction is accomplished by one or more methods including but not limited to grinding, dicing and slicing without departing from the scope of the technology as disclosed and claimed herein. Grinding, dicing and/or slicing can be selectively chosen and utilized in the process as disclosed and claimed to achieve the desired size, consistency of the product, surface area of the product, texture and/or appearance of the product. FIG. 1 is an illustration of one implementation of the technology as disclosed herein which provides one or more of a grinder 104 and a slicer 106 for size reduction of the product. Also, illustrated in FIG. 1 with broken segmented lines is a dicer indicative of one implementation of the technology as disclosed and claimed herein, which utilizes one or more of a grinder, slicer and dicer for size reduction.

The method includes applying curing and flavoring ingredients 105 to size reduced pork belly trim. For one implementation of the method, the curing and flavoring ingredients is a composition including curing ingredients such as phosphates, salts, nitrites and other appropriate ingredients. The flavoring/curing ingredients can vary depending on the sizing of the product resulting from the size reduction and the type of size reduction utilized whether grinding, dicing or slicing. The duration of the blending cycle may also vary depending on the consistency of the product, the surface area of the produce and its exterior texture. One implementation of the method as disclosed and claimed herein includes evenly distributing the size reduced pork belly trim across a conveyor and conveying the size reduced pork belly trim through a cooking chamber 112 and fully cooking the size reduced pork belly trim. One implementation of the technology can apply a liquid smoke 107 as part of the initial cooking and final cooking process.

One implementation of the method as disclosed and claimed herein includes blending the sized reduced pork belly trim and the curing and flavoring ingredients in a blender. One implementation of the method includes initially cooking 108 of the size reduced pork belly trim resulting in a partially cooked sized reduced pork belly trim and separating 110 the partially cooked size reduced pork belly trim. In one implementation of the technology as disclosed and claimed, the process of initially cooking is performed with a thermally jacketed sheeting horn. The thermally jacketed sheeting horn is used to evenly deposit the pork belly trim and starts the initial cooking to denature surface protein to keep the mixture from sticking together while cooking. The thermal jacketed sheeting horn in addition to denaturing and beginning the cooking process, also assists in separating 110 the product into small pieces as opposed to the product clinging together or forming one solid sheet or mass.

One implementation of the method as disclosed and claimed includes applying a liquid smoke drencher 109. For one implementation of the technology the sized reduced pork belly trim is size reduced with one or more of a grinder, dicer, and slicer configured to size reduce to approximately 0.1 inches to 0.75 inches. Also, for one implementation of the method as disclosed and claimed includes fully cooking with a microwave a fully cooked size reduced pork belly trim having a yield 114 of approximately 30 percent to 38 percent. Fully cooking is performed by one or more of a microwave oven, a linear oven, oil cooking and a spiral oven. For one implementation, cooking results in a fully cooked size reduced pork belly trim water activity (Aw) of less than 0.85. For one implementation of the technology as disclosed and claimed herein, the smoking and curing ingredients include sugars, smoked sugar, evaporated cane juice, smoked flavorings, sodium erythorbate, sodium ascorbate, sodium nitrates, celery juice powder, phosphates, salts and nitrites. One implementation of the method can also include a subsequent process of size reducing the fully cooked sized reduced pork belly trim.

Figure 2:
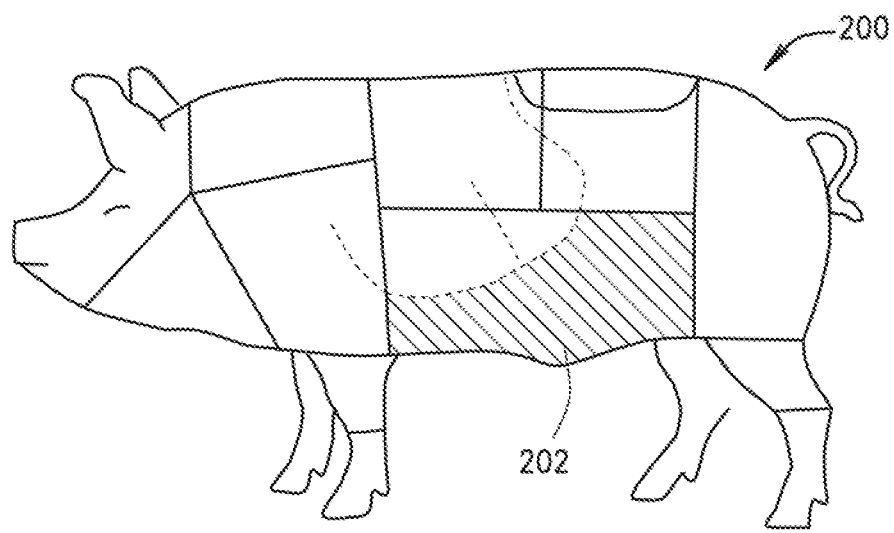
FIG. 2 and FIG. 3 are illustrations of a pork belly cut.

Referring to FIG. 2, an illustration of a pork belly cut 202 of porcine species 200. The pork belly cut 202 is the fatty lean portion of the underside and side exterior area of the porcine species. The carcass of a porcine species is processed by decapitating the carcass, removing the hooves and longitudinally cutting the carcass in half, shoulder-to-tail along the spinal channel. The carcass is separated into its primal and sub-primal cuts as identified by the cut lines illustrated in FIG. 2. During the process of separating the carcass into its primal and sub-primal cuts, the pork belly cut 202 is removed for further processing.

Figure 3:
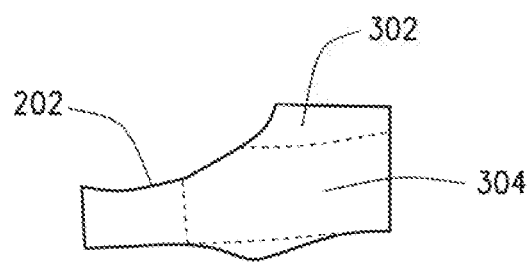

Referring to FIG. 3, an illustration of a pork belly cut 202 is provided after it has been separated from the carcass of a porcine species. The pork belly cut can then be trimmed as indicated by the cut lines 302 resulting in a bacon slab portion 304 of the pork belly cut 202. The pork belly trim removed from the pork belly cut leaves a generally rectangular bacon slab portion 304. The pork belly trim from the pork belly cut can be further processed as disclosed and claimed herein and as illustrated in FIG. 1.

Referring to FIGS. 4A, 4B and 4C, a cooking horn is illustrated. The thermally jacketed sheeting horn 400 is used to evenly deposit the size reduced pork belly trim and starts the initial cooking to denature surface protein to keep the size reduced mixture from sticking together while cooking. The thermal jacketed sheeting horn 400 in addition to denaturing and beginning the cooking process, also assists in separating the product into small pieces as opposed to the product clinging (lumping) together or forming one solid sheet or mass. One implementation of the sheeting horn is an induction heat sheeting horn.

The size reduced belly trim mixture is pushed to flow into the cooking horn entry portal 410 of the entry conduit 408. The product is extruded through the conduit 408 to flow into the pre-compression portion 402 of the cooking horn 400 through the cooking portion portal 420. The pre-compression portion 402 of the cooking horn has a laterally outward tapered portion 414 and a laterally inward tapered portion 416. The pre-compression portion has an interior channel extending from the entry portal 410 to the cooking portion 404 of the cooking horn. The pre-compression portion 402 is attached to the cooking portion 404 by a flange mount 406.

The interior channel of the pre-compression portion is in fluid communication with the interior channel 418 of the cooking portion 404. The interior channel 418 extends from the pre-compression portion 402 of the horn to the cooking horn exit portal 412. The sectional view illustrated in FIG. 4B illustrates the interior channel 418 having slopped upper and lower wall 414 and 416 respectively. The upper and lower walls include heating elements for initial denaturing of the surface protein and cooking the product as it travels through the channel 418. The upper and lower walls are sloped inward one with respect to the other such that the channel 418 progressively narrows as the channel extends toward the exit portal 412. As illustrated in FIG. 4, the upper and lower walls have a vertical slope where the slopes are inward one with respect to the other such that the vertical height of the channel 418 progressively decreases such that the channel progressively narrows vertically.

The progressive narrowing is sufficient such that the exit portal 412 is sufficiently narrow such that the product as it exits will be separated into pieces rather than lumping together. In one implementation of the technology as disclosed and claimed herein, the channel progressively narrows to a height equal to a grinding size of the ground product or the diced thickness of a diced product. In one implementation of the technology, the channel 418 has sufficiently narrowed to a height of equal to or less than approximately the diced or ground diameter size or the sliced thickness, such that the product will exit in pieces.

The various pork belly trim processing examples shown above illustrate a method for producing bacon pieces from size reduced pork belly trim. A user of the present technology as disclosed may choose any of the above implementations or combinations, or an equivalent thereof, depending upon the desired application. In this regard, it is recognized that various forms of the subject method could be utilized without departing from the scope of the present invention.

As is evident from the foregoing description, certain aspects of the present technology as disclosed are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present technology as disclosed and claimed.

Other aspects, objects and advantages of the present technology as disclosed can be obtained from a study of the drawings, the disclosure and the appended claims.

What is claimed is:

1. A method of processing pork belly trim comprising:
   trimming a pork belly trim from a pork belly cut leaving a bacon slab portion of the pork belly cut;
   size reducing the pork belly trim using one or more of a grinder, dicer and slicer thereby forming a size reduced pork belly trim;
   applying one or more of smoking, curing and flavoring ingredients to the size reduced pork belly trim;
   distributing the size reduced pork belly trim across a conveyor and conveying the size reduced pork belly trim through a cooking chamber;

fully cooking the size reduced pork belly trim;
initially cooking the size reduced pork belly trim resulting in a partially cooked size reduced pork belly trim, where initially cooking is performed with one of a thermally jacketed sheeting horn and an induction heat sheeting horn;
separating the partially cooked size reduced pork belly trim, where separating the partially cooked size reduced pork belly trim includes extruding the size reduced pork belly trim through a progressively narrowing interior channel of the thermally jacketed sheeting horn or induction heat sheeting horn such that the progressively narrowing channel extends to an exit portal and narrows to a vertical height of equal to or less than a reduction diameter size of the size reduced pork belly trim where the partially cooked size reduced pork belly trim exits the portal in pieces.

2. The method as recited in claim 1, comprising:
blending the size reduced pork belly trim and the curing and flavoring ingredients in a blender.

3. The method as recited in claim 2, comprising:
applying a liquid smoke with a liquid smoke drencher.

4. The method as recited in claim 1, where extruding between an upper and a lower wall of the progressively narrowing channel where the upper and lower walls have a vertical slope and said upper and lower walls are sloped inward with respect to each other.

5. The method as recited in claim 1, where the size reducing the pork belly trim using one or more of a grinder, dicer and slicer is with one or more of a grinder, dicer, and slicer configured to size reduce to 0.1 inches to 0.75 inches.

6. The method as recited in claim 1, where fully cooking is cooking with a microwave resulting in a fully cooked size reduced pork belly trim having a yield of 30 percent to 38 percent of a green weight of the pork belly trim.

7. The method as recited in claim 1, where fully cooking is cooking resulting in a fully cooked size reduced pork belly trim having a water activity of less than 0.85.

8. The method as recited in claim 1, where the smoking and curing ingredients includes one or more of phosphates, salts and nitrites.

9. The method as recited in claim 1, comprising:
further size reducing the fully cooked size reduced pork belly trim.

10. The method as recited in claim 1, where fully cooking is performed by one or more of a microwave oven, a radio frequency oven, a belt grill oven, a linear oven, a spiral oven and oil cooking.

11. A method of processing fresh pork belly trim portions comprising:
flowing size reduced fresh pork belly trim portions through an entry portal of a thermally jacketed sheeting horn;
extruding the size reduced fresh pork belly trim portions through a pre-compression portion of the sheeting horn;
extruding the size reduced fresh pork belly trim portions through a progressively narrowing interior channel of a cooking portion of the sheeting horn;
restricting flow of the size reduced fresh pork belly trim portions by the progressively narrowing interior channel of the sheeting horn, where the progressively narrowing interior channel extends to an exit portal and narrows to a vertical height of equal to or less than a reduction diameter size of the size reduced fresh pork belly trim portions;
denaturing and cooking the size reduced fresh pork belly trim portions by heating said size reduced fresh pork belly trim portions with one or more of an upper wall and a lower wall of the progressively narrowing interior channel to form initially cooked and denatured size reduced fresh pork belly trim portions; and
extruding the initially cooked and denatured size reduced fresh pork belly trim portions through the exit portal of the sheeting horn, thereby separating and distributing the initially cooked and denatured size reduced fresh pork belly trim portions as the initially cooked and denatured size reduced fresh pork belly trim portions exit the exit portal.

12. The method of processing fresh pork belly trim portions as recited in claim 11, where heating with one or more of the upper and lower walls is performed by one or more thermally jacketed upper and lower walls and induction heated upper and lower walls, where the upper and lower walls have a vertical slope and said upper and lower walls are sloped inward with respect to each other.

13. The method of processing fresh pork belly trim portions as recited in claim 11, where the size reduced fresh pork belly trim portions are formed using one or more of a grinder, dicer and slicer configured to size reduce fresh pork belly trim to 0.1 inches to 0.75 inches.

14. The method as recited in claim 11, comprising:
fully cooking the initially cooked and denatured size reduced fresh pork belly trim portions with one of a microwave oven, a radio frequency oven, a belt grill oven, a linear oven, a spiral oven and oil cooking resulting in fully cooked size reduced pork belly trim portions having a yield of 30 percent to 38 percent of an initial green weight of the fresh pork belly trim portions.

15. The method as recited in claim 14, where fully cooking results in the fully cooked size reduced pork belly trim portions having a water activity of less than 0.85.

16. The method as recited in claim 14, comprising:
further size reducing the fully cooked sized reduced pork belly trim portions.

17. The method as recited in claim 13, comprising:
applying one or more of smoking, curing and flavoring ingredients to the size reduced pork belly trim portions.

18. The method as recited in claim 11, comprising:
blending the size reduced pork belly trim portions and one or more of smoking, curing and flavoring ingredients in a blender.

* * * * *